United States Patent Office 3,708,335
Patented Jan. 2, 1973

3,708,335
ELECTRICALLY CONDUCTIVE FILAMENT
Shigeru Fujiwara, Kenji Nagae, and Tomomi Okuhashi, Tokyo, Japan, assignors to Teijin Limited, Osaka, Japan
No Drawing. Filed Mar. 8, 1971, Ser. No. 122,170
Claims priority, application Japan, Mar. 10, 1970, 45/20,327
Int. Cl. C09c 1/44
U.S. Cl. 117—226
13 Claims

ABSTRACT OF THE DISCLOSURE

An electrically conductive filament having durable antistatic properties under various processing and service conditions, which comprises a synthetic organic filament of 5-50 denier and an electrically conductive coating layer therearound, which coating comprises a polymeric binder matrix of acrylonitrile/butadiene copolymer, a phenolic resin and a finely divided electrically conductive carbon black or silver dispersed in said matrix, characterized in that said coating layer has been after-treated by applying thereto a polyisocyanate compound of low molecular weight, such as 4,4'-diphenylmethane diisocyanate, in an amount of 0.3 to 20% by weight based on the weight of the electrically conductive filament after the treatment, and curing it by heating.

---

This invention relates to an electrically conductive filament durable under various processing conditions such as spinning, knitting, or weaving or under various use conditions such as application of oils, scouring, dyeing, washing, dry cleaning, repetition of stretching and relaxing, repeated bending, rubbing, scrubbing, or scraping, and also having desirable fiber properties such as flexibility and pliability; a process for its production; and to antistatic fibrous structures containing said filament.

More specifically, the present invention relates to an electrically conductive filament having an electric resistance of less than $10^9$ ohm/cm., which comprises a synthetic organic filament of 5-50 denier and an electrically conductive coating layer therearound, which coating comprises a polymeric binder matrix of acrylonitrile/butadiene copolymer, a phenolic resin and a finely divided electrically conductive solid material dispersed in said matrix, characterized in that said coating layer has been after-treated by applying thereon a polyisocyanate compound of low molecular weight in an amount of 0.3 to 20% by weight based on the weight of the electrically conductive filament after the treatment, and curing it by heating; a process for its production; and fibrous structures composed of said electrically conductive filament.

Various proposals have been made so far to impart antistatic properties to synthetic organic filaments such as polyester and polyamide fibers which have little or no electrical conductivity.

Applicants already proposed that a textile material having antistatic properties can be obtained by incorporation of a small amount of an electrically conductive filament which comprises a synthetic organic filament and an electrically conductive coating layer formed on the surface of said filament, said layer comprising a polymeric binder matrix of acrylonitrile/butadiene copolymer and a phenolic resin and a finely divided electrically conducting solid material dispersed in said matrix, see U.S. patent application Ser. No. 776,758, now Pat. No. 3,582,445.

The formation of an electrically conducting coating layer according to this proposal involves the steps of coating a paste-like composition containing the matrix and the electrically conductive material on the surface of the substrate filament, drying the coating by heating, and effecting the curing of the layer sufficiently. This process, however, has the defect that in the commercial operation, high curing temperatures and long curing periods of time must be avoided, and therefore, sufficient curing is difficult to perform. This constitutes a very cumbersome problem in the continuous mass-production of the electrically conductive filament.

In the prior proposal of the applicants, a top coating comprising a water-repellent silicone or synthetic rubber type polymer and being free of an electrically conductive solid material can be applied to the electrically conductive coating layer. The formation of a top coating, however, cannot provide a substantial solution to the problem mentioned, but rather may result in adverse effects on the electrically conducting properties of the electrically conductive filament.

Further investigation was therefore made in an attempt to overcome the difficulties of the prior arts and to provide an electrically conductive filament having improved durability which can be produced continuously with good efficiency and which has completely eliminated the defect of insufficient curing. The investigation has led to a method of cross-linking and curing the electrically conductive coating layer itself by after-treatment, which is quite different from that of forming a top coating layer. According to the former method when a low-molecular-weight polyisocyanate compound is applied to the coating layer and heated, the compound readily penetrates into the coating layer to promote the curing of the layer and improve the oil resistance, chemical resistance and other properties of the layer, and the above-mentioned problem can be completely solved.

Accordingly, an object of the present invention is to provide an electrically conductive filament which has markedly improved properties with the resolution of the foregoing problem, and a process for producing such electrically conductive filament.

Another object of the invention is to provide a fibrous structure which comprises such filament and has improved durable antistatic properties.

Many other objects and advantages of the present invention will become more apparent from the following description.

In the present specification and claim, the term "electrically conductive filament" is meant to include continuous monofilaments, continuous multifilaments each comprising a bundle of the monofilaments, staple fibers and yarns made from these. By the term "fibrous structure comprising the filament" are meant knitted fabrics, woven fabrics, and non-woven fabrics produced by using this filament or a combination of this filament with other filament.

The electrically conductive filament of the invention comprises a synthetic organic filament and an electrically conductive coating layer which is after-treated by applying a polyisocyanate compound of low molecular weight thereto as an after-treating reagent, and heating it.

When the after-treating reagent still remains after penetration into the electrically conductive coating layer, the remainder can be left on the surface of the electrically conductive coating layer after having been heat-treated.

The synthetic organic filament substrate may be any synthetic filament which has a tenacity sufficient for a filament and adhesion with a coating composition. The preferred synthetic organic filaments are those of fiber-forming polyamides such as nylon 6 and nylon 66 and fiber-forming polyesters such as polyethylene terephthalate. Other fiber-forming synthetic polymers such as polyacrylonitrile, polyvinyl acetal and polyimides can similarly be used.

The monofilaments having 5–50 denier, preferably 10–30 denier or multifilaments of finer denier having a relatively small number of the individual filaments may be used.

Before the after-treatment in the present invention, the electrically conductive coating layer consists of a polymeric binder matrix of acrylonitrile/butadiene copolymer, which may contain minor amounts of another comonomer, and a phenolic resin and a finely divided electrically conductive solid material dispersed in said matrix in an amount sufficient to impart electrically conductive properties to the filament.

The acrylonitrile/butadiene copolymer as a constituent of the matrix contains acrylonitrile in an amount of about 25 to 45% by weight, preferably about 28 to 42% by weight. Lesser amounts of acrylonitrile tend to result in lower extents of improving oil resistance, chemical resistance, etc., whereas larger amounts render the copolymer less soluble in solvent in the preparation of the coating composition, and result in a reduction in the stability of the paste-like composition. The copolymer may contain minor amounts of units derived from other comonomers such as styrene, acrylic acid, or methacrylic acid, which are generally used in an amount of less than 5% by weight based on the acrylonitrile/butadiene copolymer.

The phenolic resin which constitutes the polymer binder matrix together with the acrylonitrile/butadiene copolymer includes those phenolic resins which are obtianed from at least one phenol and at least one aldehyde, and modified products thereof, which phenolic resins are compatible with the acrylonitrile/butadiene copolymer. Where the copolymer used has a relatively large amount of acrylonitrile, an ordinary phenol-formaldehyde precondensate can be used. Generally, however, oil-soluble phenolic resins preferred. Examples of such oil-soluble phenolic resin include phenolic resins modified with natural resins such as rosin or with natural oil such as cashew nut shell oil, and pre-condensates of formaldehyde and phenol having a substituent such as a tertiary butyl, tertiary amyl, phenyl or cyclohexyl group. Commercially available "Durez 12687," "Durez 11098" (products of Durez Plastics & Chem., Inc., U.S.A.), "G. E. Resin 12316," "G. E. Resin 12393" (products of General Electric Co., U.S.A.), "Synco 721" (product of Snyder Chemical Co., U.S.A.), and "CKRA 1977," "BKR 2620" (products of Bakelite Co., U.S.A.) are some of those which are preferably used in the present invention as the oil-soluble phenolic resins.

The weight ratio of the acrylonitrile/butadiene copolymer to the phenolic resin in the electrically conducting coating is preferably from 0.4:1 to 4:1, more preferably from 0.6:1 to 3:1 in view of the strength, pliability and flexibility of the coating, its adhesion to the substrate, and its resistance to chemicals and weather. When the amount of the phenolic resin in the coating is too small, the strength and chemical resistance of the coating and its adhesion to the substrate tend to be reduced. On the other hand, when it is too large, the pliability and flexibility of the coating are reduced, and the resulting electrically conductive filament tends to lose its electrical conductivity by repeated stretching and relaxing and bending. Hence, the amounts of the above-specified range are preferred.

The preferred finely divided electrically conductive solid material includes silver, electrically conductive carbon and their mixtures useful because of their resistance to chemicals and electrical conductivity. Metal powders such as gold, platinum, aluminum, copper, nickel, or tungsten may also be used. The silver powders suitable for use in the present invention have an average particle diameter of not more than 10 microns, preferably not more than 5 microns, and may be of any shape. Preferably, the powders are in the form of flat flakes. Examples of the electrically conductive carbon, include carbon blacks such as acetylene black, conductive furnace black, and conductive channel black, and finely divided graphite. Acetylene black is especially preferred.

The amount of such a finely divided electrically conductive solid material to be incorporated in the electrically conductive coating layer can be varied depending upon the type, size, shape of the material, or the type of the substrate filament, etc., and may be one sufficient to impart electrically conductive properties to the layer. For instance, when it is desired to impart satisfactory antistatic properties to organic textile fibers by mixing a small amount of the electrically conductive filament, the amount of the electrically conductive solid material is one sufficient to make the electrical resistance of the electrically conductive filament below $10^9$ ohm/cm. if the thickness of the electrically conductive coating is 0.5 micron or more.

The upper limit of the amount of the finely divided electrically conductive solid material to be present in the electrically conductive coating is determined by the strength of the coating and the adhesion between the coating and the substrate.

For instance, where fine powders of silver are used, it is preferred that not over 90% by weight of silver be present in the coating. In the case of electrically conductive carbon, amounts not over 60% by weight are generally preferred. The optimum proportion of the finely divided electrically conductive solid material in the coating depends upon such factors as the type, size and shape of the electrically conductive fine powders, and the thickness of the coating. Commercially feasible ranges that are preferred in the present invention are about 70 to 90% by weight, especially 75 to 87% by weight, when silver alone is used, and about 7 to 60% by weight, especially 10 to 40% by weight when carbon is used alone.

The paste-like coating composition for the formation of an untreated electrically conductive coating layer on the surface of the substrate filament consists of the components for forming the polymeric binder matrix, the finely divided electrically conductive solid material, and a solvent for said matrix-forming components. If desired, the coating composition may contain a curing agent for the phenolic resin, such as hexamethylene tetramine, a viscosity-increasing agent for the coating composition, such as coumarone-indene resin, or an antioxidant such as 2,6-di-tert.-butyl-p-cresol.

The coating composition is applied to the surface of a synthetic organic filament in the desired amount by any conventional means such as immersion, coating, and spraying.

The coating layer formed on the surface of the synthetic organic filament, in an undried condition or after having been semi-dried or dried to form a semi-solid or solid layer, is after-treated in accordance with the process of the invention in which a polyisocyanate compound of low molecular weight, preferably having a molecular weight of not over about 1,000 is applied to the surface of the coating layer and then heated.

In one embodiment, the synthetic organic filament having applied thereto the coating composition is passed through a hot air drier at 70–230° C. to volatilize the solvent in the composition, and then the after-treating reagent is applied onto it. The volatilization and drying step at this time may be performed in one or a plurality of stages. The preferred solvents useful in the preparation of the paste-like coating composition are those having sufficient volatility at the drying temperature described, and examples of such solvents include ketones such as methyl ethyl ketone and methyl isobutyl ketone, chlorinated hydrocarbons such as dichloroethane, esters such as ethyl acetate, nitrohydrocarbons such as nitromethane, mixtures of these with each other or with a diluent such as toluene.

The electrically conductive filament of the invention is obtained by coating the paste-like coating composition on the surface of a synthetic organic filament, applying an after-treating reagent on the dried or undried coated layer, and then heating it. When the drying is performed in a plurality of stages, the application of the after-treating reagent to the coated layer may be effected at any optional stage after the first step.

The polyisocyanate compound used as the after-treating reagent in the present invention should have lower molecular weight such that it can penetrate into at least the surface layer of the pre-formed electrically conductive coating layer. The molecular weight of this compound is generally not over about 1,000 although it may vary depending upon such factors as the type of the polyisocyanate compound used, the extent of drying of the pre-formed electrically conductive coating layer, the thickness of the coating layer, the type of the matrix-forming component of the coating layer, or its composition.

Any polyisocyanate compound can be used except those which form only a top coating layer on the electrically conductive coating layer and cannot permeate into the layer.

The polyisocyanate compounds used in the invention may be expressed by the general formula $$R(NCO)_n$$

wherein R is an organic radical and $n$ is an integer of 2 or more, and have a molecular weight of less than about 1,000. Those in which $n$ is 2 to 6, preferably 2 to 4 are easy to use, but those having larger $n$ may also be used. The polyisocyanate compounds having a high isocyanate group content, even when applied to a filament having formed thereon a solid coating layer, readily permeate into the coating layer, and by heating, promote the curing of the coating layer to give an electrically conductive coating which is tough and excellent in resistances to oils and chemicals.

Examples of the polyisocyanates that come within the foregoing general formula include $C_4$–$C_{12}$ polymethylene diisocyanates such as hexamethylene diisocyanate; aliphatic aliphatic diisocyanates such as meta-xylylene diisocyanate; alicyclic diisocyanates such as 1,3-hexahydroxylene diisocyanate, 4,4'-dicyclohexylmethane diisocyanate or hydrated tolylene diisocyanate; aromatic diisocyanates such as 2,4-tolylene diisocyanate, 1,4-phenylene diisocyanate, 4,4'-biphenylene diisocyanate, 4,4'-diphenylmethane diisocyanate, 3,3'-dimethyl-4,4'-diphenylmethane diisocyanate or 1,5-naphthalene diisocyanate; polyisocyanates having three or more functional groups derived from polyvalent primary amines having three or more functional groups, such as triphenyl methane-4,4',4''-triisocyanate or polymethylene polyphenyl isocyanates

[OCN—$C_6H_4$—$CH_2$(OCN—$C_6H_3$—$CH_2$)$_n C_6H_4$—NCO $n=1$–10]; polyisocyanate urethanes obtained by the reaction of polyhydric alcohols having three or more functional groups such as glycerine, trimethylolethane, trimethylolpropane, or pentaerythritol with the diisocyanates described (the diisocyanates are reacted at a ratio equimolar to the —OH group in the polyhydric alcohols); diisocyanate compounds having a molecular weight of about less than 1,000 which have an isocyanate group at both terminals and are obtained by reaction of low-molecular-weight polyethers or polyesters with the diisocynates described; and mixtures thereof.

In view of the reactivity (promotion of curing), cost, low toxicity and ease of handling, the aromatic isocyanates, preferably aromatic diisocyanates, and polyisocyanate urethanes are preferred in the present invention.

The electrically conductive filament having markedly improved resistances to oils and chemicals is provided in accordance with the invention by after-treating the electrically conductive coating layer with the polyisocyanate compound described. The use of such polyisocyanate compound effectively promotes the curing of the electrically conductive coating layer by heating, and makes it possible to produce the electrically conductive filament continuously with high efficiency and without involving insufficient curing of the electrically conductive layer.

The means of applying the polyisocyanate compound to the coating layer differs somewhat according to whether it is immediately after the coating of the paste-like electrically conductive coating composition or it is after drying to form a solid coating layer. Usually, a solution of the polyisocyanate is applied to the coating layer by any conventional means such as immersion, spraying or coating.

The solvents that are used to form a solution of the polyisocyanate are volatile organic solvents which dissolve the polyisocyanate compound and are inert to the isocyanate group. Examples of the preferred solvents include aromatic hydrocarbons such as benzene and toluene; chlorinated hydrocarbons such as methylene dichloride, ethylene dichloride or chlorobenzene; esters such as ethyl acetate and butyl acetate; ethers such as dioxane and tetrahydrofuran; and mixtures of these. The solution of the polyisocyanate may contain minor amounts of additives such as catalysts.

Examples of the catalyst include tertiary amines such as triethylenediamine, triethylamine and organic tin compounds such as dibutyltin dilaurate.

The amount of the polyisocyanate compound to be coated is preferably 0.3 to 20% by weight based on the electrically condutive filament after treatment. More preferably, the amount is 1 to 10% by weight. Amounts less than 0.3% by weight do not produce sufficient effect of promoting the curing of the coating layer, and result in lesser extents of improving the oil and chemical resistances of the resultant electrically conductive filament. Application of excess amounts of the polyisocyanate compounds is not necessary for promoting the curing of the coating layer. It may frequently result in the formation of an insulating layer from the polyisocyanate compound on the electrically conductive coating layer to reduce its electrical conductivity, or impede the pliability or flexibility of the resultant electrically conductive filament. The use of excessive amounts of the polyisocyanate compounds is therefore not desirable.

After applying the polyisocyanate compound of the desired amount to the surface of the electrically conductive coating layer and permeating it into the coating layer, the filament is passed through an air bath for instance at 120–240° C. for 1–30 seconds. By this procedure, a sufficiently cured electrically conductive coating can be formed, which is excellent in resistance to oils and chemicals and has good pliability and flexibility as well as durability. The application of the polyisocyanate compound is easier after applying the paste-like coating composition onto the surface of the substrate synthetic filament and drying it to form a semi-solid, or solid coating layer, and this is preferred as the time of application of the polyisocyanate compound.

It is interesting to note that the use of a preadmixture of the paste-like coating composition with the polyisocyanate compound has proved ineffective because of a number of undesirable effects such as the gellation of the paste-like coating composition, the shortening of the pot life, or reduced adhesion of the coating to the substrate filament.

The thickness of the electrically conductive coating is restricted by the electric conductivity of the resulting electrically conductive filament and its functional properties as textile fibers. Although it depends upon the kind, size and shape of the finely divided electrically conductive solid material present in the coating layer, an average thickness smaller than 0.5 micron cannot sufficiently achieve the desired electric conductivity. The upper limit of the thickness of the coating depends on the denier of the synthetic organic filament used, but the thickness in excess of 15 microns is not necessary for the objects of the present invention. Coating of an excessive thickness is not desirable because of adverse effects on the pliability and flexibility of the electrically conductive filament obtained. If the finely divided electrically conductive solid material is silver, the average thickness of 0.5 to 10 microns, especially about 0.7 to 5 microns, suffices to achieve the object of the present invention. In the case of carbon, the average thickness that is effective in the invention is at least one micron, for example 1 to 15 microns, especially about 2 to 12 microns.

By forming a cured electrically conductive coating of a thickness 0.5 to 15 microns on the surface of a synthetic organic filament, an electrically conductive filament having good pliability and flexibility can be obtained which has an electrical resistance of $10-10^9$ ohm/cm.

The electrically conductive filament of the invention has functional properties as textile fibers. The filament has mechanical properties comparable to those of the substrate filament, i.e., tenacity at break of at least about 1 g./den., especially at least about 2 g./den., elongation at break of at least about 3%, especially at least about 10% and an initial Young's modulus of not more than about 2,000 kg./mm.$^2$, especially not more than about 2,000 kg./mm.$^2$. It is further light in weight with a specific gravity of less than about 2.5 g./cm.$^3$, especially less than about 2 g./cm.$^3$. The filament of the invention has sufficient durability to various conditions which textile fibers ordinarily undergo. Static prevention of organic textile fibers can be effected by incorporating the electrically conductive filament of the invention therein without impairing the feel and physical properties of the organic textile fibers.

The electrically conductive filament can be incorporated easily into organic textile fibers, in the form of monofilaments, multifilaments or staple fibers.

Textile materials having a durable antistaticity are composed of normal organic textile fibers and a small quantity of the aforesaid electrically conductive fibers, and they can have the desired antistaticity and the mechanical properties and appearance that are satisfactory for practical purposes even if only a small quantity, say less than 2%, preferably 0.001 to 1.5%, by weight, of the conductive fiber is present.

The mixing of the conductive fiber and the organic textile fibers can be carried out by mixed spinning, mixed twisting, mixed weaving, mixed knitting or any other optional technique. Further, the former need not necessarily be distributed evenly in the latter. Carpet yarns, weaving or knitting yarns, or sewing threads can be first mixed with the conductive fiber and then the tufting, weaving, knitting or sewing may be carried out with the mixture, ensuring that the conductive fiber is present at suitable intervals in the end product. For example, a shirt may be sewn with a polyester cloth using a sewing thread containing about 8% by weight of the conductive fiber. In this case, the end product shirt contains only a mere 0.05% by weight of the conductive fiber, but it still demonstrates very satisfactory antistaticity. On the other hand, when the end product is a skirt, the undesirable phenomenon of the skirt and underwear acting together and clinging to the human body is controlled to a marked degree by merely sewing a single line of a conductive fiber in the hemmed portion of the skirt. In this case, the content of the conductive fiber based on the total skirt can be as little as 0.005% by weight.

The mechanism by which the static electricity is suppressed is believed to be due to the electricity removing function of fine electrically conductive filaments present in the textile materials, which is based on their ability of corona discharging.

The textile materials can be for example a staple blend, spun yarn, twisted yarn, tape, woven fibric, knit fabric, non-woven fabric, sewn articles or carpet, garment and upholstery.

The invention will be described in greater detail by the following examples, in which various properties of the electrically conductive filament were measured by the methods mentioned below.

(1) Measurement of electrical resistance

The sample filament is placed on an insulating rubber plate, and pressed from above by both electrodes of a measuring device at points one centimeter apart from each other. The electrical resistance is then read. When the resistance is less than $1 \times 10^6$ ohm/cm., FM tester, Model L–19–B, manufactured by Yokogawa Electric Works, Japan (measuring voltage 3 v.) is used, and for measurement of higher electric resistance values, an automatic insulating-ohm meter, Model L–68, manufactured by Yokogawa Electric Works, Japan (measuring voltage 1,000 v.). The latter is capable of measuring the electrical resistance of the filament up to $2 \times 10^9$ ohms. The lowest scale of this measuring apparatus is $1 \times 10^6$ ohms, and lower resistances cannot be read.

(2) Measurement of oil resistance

A sufficient amount of a textile oil (for nylon 6 carpet; consisting of 89% mineral oil, 5% polyoxyethylene alkyl ether, and 6% polyethylene glycol fatty acid ester) is coated on the sample. Thereafter it is allowed to stand for 24 hours, and the filament is then rubbed for 15 minutes with a nylon gear. The electrical resistance of the filament is then measured in accordance with the procedure mentioned in (1) above.

The method of rubbing used in this test is as follows:
The filament is rubbed for 15 minutes with a nylon gear (120 r.p.m., diameter 5 cm., thickness 4 cm., the number of teeth 20) stretched under a load of 1 g./den. at one end, calculated on the basis of the substrate filament. Another end of the filament is connected to a shaft rotating at 15 r.p.m. Thus, the filament is rotated about its axis, and is evenly rubbed with the nylon gear along its entire circumference.

(3) Measurement of resistance to dry cleaning

The sample filament is immersed for 10 minutes in tetrachloroethylene at 70° C., withdrawn, and immediately rubbed with the same nylon gear mentioned in (2) above for 15 minutes. Thereafter, the electrical resistance of the filament is measured in the same way as mentioned in (1) above. Tetrachloroethylene is poured occasionally on the filament during rubbing with the nylon gear to keep the filament wet all the time.

(4) Measurement of frictional resistance

The filament sample 25 mm. in length is hung over a glass rod, 7 mm. in diameter, having a smooth surface and a circular section. An initial load of 500 mg. of tensioning is exerted on each end of the filament. On one end, the load is increased by 100 mg. gradually, and the load at which the filament begins to slip is determined. A coefficient of friction is calculated from the following equation.

$$\text{Coefficient of friction} = \frac{\log T_1 T_0}{\pi \log e} = \frac{\log T_1/T_0}{1.36}$$

(where $T_0$ is an initial load, and $T_1$ is a final load)

The amount of the polyisocyanate compound to be applied to the electrically conductive coating was expressed in percent based on the weight of the electrically conductive filament obtained.

All parts and percentages appearing in the examples are by weight.

EXAMPLE 1

A well-mixed paste-like composition consisting of 80 parts of flaky silver powders (having an average particle diameter of 1.5 microns), 12 parts of acrylonitrile-butadiene copolymer (nitrile content 32%), 8 parts of modified phenolic resin (Durez 12687), 60 parts of methyl ethyl ketone, and 20 parts of chlorobenzene was coated on the surface of a nylon 6 monofilament of 15 denier moving at 25 m./min. by a rotating roller, and the filament was then passed through a hot air dryer at 125° C. for 2.4 seconds to form a solid coating layer.

A 15% solution of 4,4'-diphenylmethane diisocyanate in ethylene dichloride was applied in varying amounts to the coating layer by a rotary roller, and the filament was passed through an air bath at 200° C. for 2.8 seconds. Electrically conductive monofilaments shown in Table 1 were obtained. The amount of the polyisocyanate compound was varied by changing the number of rotation of the roller. For purposes of comparison, an electrically conductive filament was obtained without applying the polyisocyanate compound.

The electrically conductive monofilaments obtained had the fiber properties shown in Table 1, from which it is seen that these filaments have mechanical properties, pliability, and flexibility much the same as those of the substrate filament, and are light in weight.

TABLE 1

| Sample No.: | Amount of 4,4'-diphenyl methane diisocyanate (percent) | Thickness of the electrically conductive coating (microns) | Electrical resistance (ohm/cm.) | Tenacity at break (g./den.) | Break tenacity calculated as the substrate filament (g./den.) | Elongation at break (percent) | Initial Young's modulus (kg./mm.²) | Specific gravity (g./cm.³) |
|---|---|---|---|---|---|---|---|---|
| A-1 (control) | 0 | 3.4 | 40 | 2.8 | 5.5 | 48 | 220 | 1.7 |
| A-2 | 1.0 | 3.4 | 40 | 2.8 | 5.4 | 45 | 240 | 1.7 |
| A-3 | 3.6 | 3.4 | 50 | 2.8 | 5.6 | 50 | 230 | 1.7 |
| A-4 | 6.9 | 3.4 | 90 | 2.8 | 5.8 | 50 | 250 | 1.7 |

The oil resistance, the drycleaning resistance, and the frictional coefficient of these electrically conductive filaments were tested. The results are given in Table 2.

TABLE 2

| | Amount of 4,4'-diphenyl methane diisocyanate (percent) | Electrical resistance (ohm/cm.) | | | Coefficient of friction |
|---|---|---|---|---|---|
| | | Before test | After the oil resistance test | After the drycleaning resistance test | |
| Sample No.: | | | | | |
| A-1 (control) | 0 | 40 | ∞ | ∞ | 0.78 |
| A-2 | 1.0 | 40 | 1×10⁶ | 1×10⁶ | 0.28 |
| A-3 | 3.6 | 50 | 100 | 80 | 0.22 |
| A-4 | 6.9 | 90 | 200 | 150 | 0.20 |

Samples A-2, A-3, and A-4 retained their electric conductivity in the oil resistance test and the drycleaning resistance test, and had very good durability with no peel off of the coating layer. Furthermore, since the frictional coefficient of these filaments is small, they lend themselves to easy handling. On the other hand, in Sample A-1 to which the polyisocyanate compound was not applied, the textile oil or solvent permeated into the electrically conductive coating, and in a wet condition, the electrically conductive coating came off from the substrate filament by friction. This indicates that the filament of Sample A-1 has insufficient durability for use under such conditions. Furthermore, the control Sample A-1 had large coefficient of friction, and slipped difficultly. It is therefore likely to break when rewinding from a bobbin.

In order to illustrate the cure promoting effect of the invention, the following experiment was further performed.

Four electrically conductive monofilaments were produced under the same conditions as described above except that the amount of 4,4'-diphenylmethane diisocyanate was kept at 3.6%, and the temperature of the air bath for heat curing was set at 140° C., 160° C., 180° C., and 200° C. For purposes of comparison, electrically conductive filaments were prepared under the same conditions without applying the polyisocyanate compound.

Each of these electrically conductive filaments was immersed in methyl isobutyl ketone, which is a solvent for the acrylonitrile/butadiene copolymer and modified phenolic resin, at room temperature for 60 seconds with slow stirring. The difference in weight before and after the immersion was measured, and the ratio of weight loss was determined. The results are given in Table 3.

TABLE 3

| | Ratio of weight loss (percent) | |
|---|---|---|
| Temperature of the air bath (° C.) | 4,4'-diphenylmethane diisocyanate adhered in 3.6% | No application the isocyanate (control) |
| 140 | 4 | ¹ 46 |
| 160 | 2 | 32 |
| 180 | 1 | 13 |
| 200 | 1 | 7 |

¹ All coating layer eluted.

The time for treating the filament in the air bath was 4.8 seconds. Raising the air bath temperature above 200° C. was impossible as it resulted in filament breakage and failure of continuous production.

The results given in Table 3 indicate that according to the process of the invention, the matrix can be sufficiently cured by heat-treatment for a very short time, and excellent durability as shown in Table 2 can be imparted to the filament. On the other hand, when the electrically conductive coating layer is not treated with the polyisocyanate compound, the weight loss is as large as 7% even when the filament is treated at the maximum temperature at which the continuous production of the electrically conductive filament can be performed. This indicates insufficient curing of the coating layer. Even in the absence of treatment with the polyisocyanate compound, if the filament is wound up on a bobbin and heat-treated at 150–180° C. for prolonged periods of time, such as 30 minutes or longer, the weight loss will decrease to 1%. In this case, however, the filament adheres to itself on the bobbin, and cannot be taken out. Furthermore, such a long time heat-treatment is very disadvantageous in commercial production.

The electrically conductive filaments (of the invention and of control) given in Table 3 and produced at an air bath temperature of 200° C. corresponded to Samples Nos. A-3 and A-1 shown in Tables 1 and 2.

It was confirmed that the electrically conductive filaments after-treated with the polyisocyanate compound have excellent properties same as the electrically conductive filaments obtained by using a matrix comprising acrylonitrilebutadiene/phenol resin but not post-treated with the polyisocyanate compound, such as pliability, flexibility, resistance to stretch, resistance to bonding, resistance to weather, or resistance to dyeing.

The electrically conductive filaments (Samples A-2, A-3 and A-4) indicated excellent durability since their electrical resistances hardly changed when they were scoured with a bath containing 1 g./liter of a nonionic detergent and 0.3 g./liter of sodium carbonate at 95° C. for 60 minutes, and dyed by using a dye bath containing 0.15 g./liter of a surface active agent, 0.16 g./liter of ammonium sulfate and a dyestuff whose pH was adjusted to 4.6 to 4.8 with acetic acid, at 95° C. for 60 minutes.

Furthermore, Samples A-2, A-3 and A-4 did not show any appreciable change in electrical resistance when immersed at room temperature for 20 hours in methanol, ethyl acetate, toluene, 10% aqueous solution of sulfuric acid, 20% aqueous solution of sodium hydroxide, and 20% aqueous solution of acetic acid, respectively nor when allowed to stand at room temperature for 20 hours in an atmosphere of nitrogen oxide gas, hydrogen sulfide gas, or sulfur dioxide gas, respectively. Thus, they showed excellent resistances to solvents, chemicals and gases.

When each of these electrically conductive filaments was exposed for 300 hours on a Xenon weather-Ometer, it exhibited a tenacity retention of 95%, and hardly any change in electrical resistance.

It was also observed that when each of the filaments was subjected to 50 times of 5% stretching-relaxation, it still retained its electric conductivity.

Each of the electrically conductive monofilaments A-1, A-2, A-3 and A-4 was associated and twisted with a crimped non-conductive nylon yarn (2600 denier/136 filaments) in the process of twisting the latter. On the electrically conductive yarn thus obtained, 2% by weight of the textile oil which is the same as used in the oil resistance test was coated. A tufted carpet was prepared by disposing a line of the conductive yarns among the non-conductive crimped nylon yarns at every sixth line of the non-conductive yarn (conductive filament content: about 0.18%). When the carpet produced by using the electrically conductive monofilament A-1 was left for 3 months, the yellowing of the crimped nylon yarn was observed, and the electrically conductive coating was swollen to an extent such that unless great care was exercised in handling, the coating layer would be readily stripped off by friction. In contrast, the carpets produced by using the electrically conductive filaments A-2, A-3 and A-4 scarcely shows any yellowing of the crimped nylon yarn or swelling of the electrically conductive coating layer even when left for 3 months. In these carpets, there was hardly any reduction in adhesion between the electrically conductive coating layer and the substrate filament.

The carpets produced by using the electrically conductive filaments A-2, A-3 and A-4 were each scoured and dyed, and thereafter, a backing was applied to each of the carpets so treated. Thereafter, a person wearing leather-soled shoes walked over each of the carpets at 25° C. and 10% relative humidity, and the saturated electrification voltage on the human body was measured. When the carpet did not contain the electrically conductive filament, the electrification voltage reached as high as −8,000 volts, and when the person touched a grounded conductor such as metal, he got a violent shock. On the other hand, when the carpet contained the electrically conductive filament of the present invention, the electrification voltage on the human body was only −1,000 volts to 1,200 volts, and there was not felt any electric shock.

As shown above, the electrically conductive filaments of the invention designated as Samples A-2, A-3 and A-4 showed excellent durability to severe conditions such as the twisting step, tufting step, scouring and dyeing step, and it was confirmed that the use of a small amount of the electrically conductive filament of the invention makes it possible to impart durable antistatic properties to the textile products.

When 2% of 4,4'-diphenylmethane diisocyanate was added on the basis of the resin component to the paste-like composition, and the production of an electrically conductive filament was attempted, the gelation of the composition occurred and it was impossible to apply the paste-like composition uniformly onto the substrate filament. Thus, it was impossible to obtain filaments having durable electric conductivity.

EXAMPLE 2

(B) Various paste-like compositions containing silver powders in an amount of 80% calculated as the solids content were prepared in the same manner as mentioned in Example 1 except that the proportion of the acrylonitrile/butadiene copolymer to the modified phenolic resin was varied as shown in Table 4 (B-1 to B-3).

(C) Various paste-like compositions containing acetylene carbon black in an amount of 20% calculated as the solids content were prepared similarly by varying the ratio of the acrylonitrile/butadiene copolymer to the modified phenolic resin as shown in Table 4, C-1 to C-3.

A 20-denier nylon 6 monofilament was at a speed of 25 meters per minute immersed in each of these paste-like compositions, and the thickness of the coating of the composition applied was regulated by passing it through a slit. Thereafter, the filament was passed through a hot dryer for 4.8 seconds at 130° C. to form a solid coating layer. The filament was then immersed in a 30% solution of 4,4'-diphenylmethane diisocyanate in chlorobenzene for 0.5 second, and then passed through an air bath at 190° C. for 5 seconds, to form an electrically conductive filament.

The thickness of the electrically conductive coating was adjusted to 3.6 microns when the silver powder was used, and 6.0 microns when acetylene black was used. The amount of the diisocyanate compound was adjusted to 3.6% in the case of silver, and 4.0% in the case of acetylene black.

For purposes of comparison, electrically conductive filaments were produced by using each of the above-mentioned paste-like compositions without applying the polyisocyanate compound under the same conditions as mentioned above.

The properties of the electrically conductive filaments both of the present invention and control are shown in Table 4. As is clear from this table, the application of the polyisocyanate compound to the filament having formed thereon a solid electrically conductive coating layer led to a marked improvement in the resistance of the filaments to oils and drycleaning, and in their ease of slippage.

TABLE 4

| | Matrix | | Present invention (after-treated with 4,4'-diphenyl methane diisocyanate) | | | | Control (without after-treatment with the polyisocyanate compound) | | | |
|---|---|---|---|---|---|---|---|---|---|---|
| | | | Electrical resistance (ohm/cm.) | | | | Electrical resistance (ohm/cm.) | | | |
| Sample No. | Acrylonitrile/ butadiene copolymer (percent) | Modified phenolic resin (percent) | Before test | After the oil resistance test | After the drycleaning resistance test | Coefficient of friction | Before test | After the oil resistance test | After the drycleaning resistance test | Coefficient of friction |
| B-1 | 75 | 25 | 40 | 100 | 90 | 0.24 | 30 | ∞ | ∞ | 0.78 |
| B-2 | 60 | 40 | 40 | 120 | 70 | 0.22 | 30 | ∞ | ∞ | 0.76 |
| B-3 | 40 | 60 | 50 | 120 | 70 | 0.20 | 40 | ∞ | ∞ | 0.75 |
| C-1 | 70 | 30 | $5 \times 10^5$ | $2 \times 10^6$ | $3 \times 10^6$ | 0.24 | $2 \times 10^5$ | ∞ | ∞ | 0.82 |
| C-2 | 50 | 50 | $4 \times 10^5$ | $1 \times 10^6$ | $1 \times 10^6$ | 0.22 | $2 \times 10^5$ | ∞ | ∞ | 0.80 |
| C-3 | 25 | 75 | $5 \times 10^5$ | $3 \times 10^6$ | $3 \times 10^6$ | 0.20 | $3 \times 10^5$ | ∞ | ∞ | 0.78 |

EXAMPLE 3

A 20-denier polyethylene terephthalate monofilament was immersed at a feed rate of 25 m./min. in a paste-like composition comprising an intimate mixture of 25 parts of acetylene black, 45 parts of an acrylonitrile/butadiene copolymer (with an acrylonitrile content of 32%), 30 parts of modified phenolic resin (same as in Example 1) and 350 parts of methyl ethyl ketone, and the thickness of the coating was adjusted by passing it through a slit. Thereafter, it was passed through a hot air dryer at 130° C. for 2.4 seconds to form a solid coating layer. A 15% solution of a triisocyanate compound in ethyl acetate (the triisocyanate compound being obtained by the reaction of 1 mole of trimethylol propane with 3 moles of tolylene diisocyanate) was applied to the solid coating layer by a rotary roller, and the filament was passed through an air bath at 230° C. for 4.8 seconds, and each of the electrically conductive filaments shown in Table 5 was continuously produced.

The thickness of the electrically conductive coating was maintained at 6.0 microns, and the amount of the triisocyanate compound to be applied was varied. The properties of the electrically conductive filaments obtained are shown in Table 5.

TABLE 5

| Sample No. | Amount of the triisocyanate compound applied (percent) | Electrical resistance values (ohm/cm) | | | Coefficient of friction |
|---|---|---|---|---|---|
| | | Before test | After the oil resistance test | After the dry cleaning resistance test | |
| D-1 | 0.1 | 2×10$^5$ | ∞ | ∞ | 0.50 |
| D-2 | 1.0 | 2×10$^5$ | 1×10$^7$ | 3×10$^6$ | 0.30 |
| D-3 | 3.6 | 4×10$^5$ | 5×10$^6$ | 7×10$^5$ | 0.24 |
| D-4 | 6.9 | 6×10$^5$ | 4×10$^6$ | 4×10$^6$ | 0.22 |

The electrically conductive filaments of Samples D-2, D-3, and D-4 show excellent resistances to oils and dry cleaning, and the electrically conductive coating applied did not come off from the substrate filaments. On the other hand, the sample B-1 had poor durability, and the curing of the electrically conductive coating layer was insufficient. Moreover, the peel off of the electrically conductive coating layer from the substrate filament was observed. In Sample D-1, the amount of the polyisocyanate compound to be applied was insufficient, and the resistance to oil was not improved fully.

EXAMPLE 4

Electrically conductive filaments treated with the various polyisocyanate compounds indicated were prepared under the same conditions as set forth in Example 1, and the properties of these filaments were examined. The results are given in Table 6, from which it is seen that there was an effect of after-treating the electrically conductive coating with the polyisocyanate compound.

TABLE 6

| | Polyisocyanate compound | | Electrical resistance (ohm/cm.) | | | Coefficient of friction |
|---|---|---|---|---|---|---|
| Sample No. | Kind | Amount applied (percent) | Before test | After the oil resistance test | After the drycleaning resistance test | |
| A-1 (control) | | 0 | 40 | ∞ | ∞ | 0.78 |
| E-1 | Hexamethylene diisocyanate | 3.6 | 40 | 200 | 500 | 0.24 |
| E-2 | Metaxylylene diisocyanate | 4.2 | 60 | 180 | 300 | 0.24 |
| E-3 | 4,4'-dicyclohexylmethane diisocyanate | 3.5 | 70 | 150 | 300 | 0.25 |
| E-4 | Lysine diisocyanate | 3.4 | 60 | 150 | 200 | 0.25 |
| E-5 | 2,4-tolylene diisocyanate | 4.0 | 50 | 140 | 120 | 0.20 |
| E-6 | 3,3'-dimethyl-4,4'-diphenylmethane diisocyanate | 3.5 | 70 | 120 | 120 | 0.27 |
| E-7 | Triphenylmethane-4,4',4''-triisocyanate | 3.0 | 50 | 100 | 100 | 0.30 |
| E-8 | Polymethylene polyphenyl polyisocyanate | 2.8 | 70 | 190 | 250 | 0.32 |

EXAMPLE 5

(F) Paste-like compositions were prepared from flaky silver powders (average particle diameter of 1.5 microns), a nitrile rubber-phenolic resin composition (70 parts of acrylonitrile/butadiene copolymer containing 37% of acrylonitrile and 30 parts of modified phenolic resin same as that used in Example 1) and solvents at the proportions indicated in Table 7, F-1 to F-4.

(G) Paste-like compositions were prepared from acetylene black, the nitrile rubber-phenolic resin composition (having the composition and the proportions as indicated above) and solvents of suitable amounts.

A 15-denier nylon 6 monofilament was immersed in each of the paste-like compositions obtained, and a solid coating layer was formed in the same way as set forth in Example 1. Thereafter, a solution of a triisocyanate compound obtained by the reaction of one mole of trimethylene propane with 3 moles of hexamethylene diisocyanate was applied to the coating layer, followed by curing by heating, thereby to obtain an electrically conductive filament. The amount of the triisocyanate compound was 3.5% when silver powders were used, and 4.0% when acetylene black was used. For purposes of comparison, electrically conductive filaments were obtained without applying the polyisocyanate compound. The properties of the resulting filaments are shown in Table 7.

TABLE 7

| Sample No. | Mixing ratio in the paste-like composition | | Present invention (after-treated with the triisocyanate compound) | | | | | Control (not treated with the triisocyanate compound) | | | | |
|---|---|---|---|---|---|---|---|---|---|---|---|---|
| | Electrically conductive fine powders (percent) | Polymer matrix (percent) | Thickness of the electrically conductive coating layer (microns) | Electrical resistance (ohm/cm.) | | | Coefficient of friction | Thickness of the electrically conductive coating layer (microns) | Electrical resistance (ohm/cm.) | | | Coefficient of friction |
| | | | | Before test | After the oil resistance test | After the drycleaning resistance test | | | Before test | After the oil resistance test | After the drycleaning resistance test | |
| F-1 | 1 75 | 25 | 3.9 | 30 | 200 | 100 | 0.24 | 3.9 | 30 | ∞ | ∞ | 0.75 |
| F-2 | 1 80 | 20 | 2.9 | 40 | 120 | 100 | 0.24 | 2.9 | 30 | ∞ | ∞ | 0.76 |
| F-3 | 1 80 | 20 | 1.5 | 80 | 160 | 130 | 0.23 | 1.5 | 70 | ∞ | ∞ | 0.80 |
| F-4 | 1 85 | 15 | 1.7 | 40 | 150 | 120 | 0.24 | 1.7 | 30 | ∞ | ∞ | 0.72 |
| G-1 | 2 15 | 85 | 8 | 2×10⁵ | 1×10⁵ | 3×10⁵ | 0.27 | 8 | 2×10⁵ | ∞ | ∞ | 0.80 |
| G-2 | 2 30 | 70 | 4 | 5×10⁵ | 1×10⁵ | 1×10⁵ | 0.27 | 4 | 4×10⁵ | ∞ | ∞ | 0.78 |
| G-3 | 2 40 | 60 | 2 | 1×10⁵ | 7×10⁵ | 5×10⁵ | 0.30 | 2 | 8×10⁵ | ∞ | ∞ | 0.78 |

¹ Silver.
² Acetylene black.

It is clear from the comparison of these two types of the electrically conductive filaments that the oil resistances of the electrically conductive filaments of the present invention were markedly improved.

EXAMPLE 6

An electrically conductive monofilament (specimen A-3 obtained in Example 1) was laid together with two polyethylene terephthalate/cotton blend yarns (blend ratio being 65/35) of 30 count and subjected to a final twist to form a ply yarn having electrical conductivity. Using this yarn and an ordinary 30 count ply yarn having no electrical conductivity, a polyethylene terepthalate/cotton twill cloth was woven by arranging the electrically conductive yarn in the warp direction at various intervals indicated in Table 8. Working wears were sewn by using the resulting twill cloths.

Each of these working wears was washed for 20 minutes in a warm water at 60° C. containing 1 g. per liter of a non-ionic detergent, and dried after removing the detergent thoroughly. A person wearing insulated shoes put off each of these wears, and an undressing test was conducted at 25° C. and 30% RH.

TABLE 8

| Specimen No. | Interval of the electrically conductive yarn incorporated (cm.) | Ratio of the electrically conductive filament incorporated (percent) | At the time of undressing the working wears | |
|---|---|---|---|---|
| | | | Electrification voltage of the human body (kv.) | Electrification voltage of the working wear (kv.) |
| 1 | (¹) | 0 | 11.0 | −60.0 |
| 2 | 10 | 0.01 | −2.0 | −7.0 |
| 3 | 5 | 0.02 | −1.0 | −5.0 |
| 4 | 1 | 0.1 | −0.5 | −2.0 |
| 5 | 0.5 | 0.2 | −0.5 | −2.0 |

¹ Not incorporated.

The working wear containing no electrically conductive filament and the wearer of it showed a high electrification voltage at the time of its putting off. An unpleasant sound of static charge was heard, and the wearer received an electric stock when touching a grounded conductive material such as metal. On the other hand, in the case of the working wears containing the electrically conductive filament, the electrification voltage was low for both the wears and wearers. The above-mentioned troubles could be reduced greatly, and they exhibited a very excellent antistatic effect.

EXAMPLE 7

One electrically conductive monofilament (specimen A-3 obtained in Example 1) was doubled with one 75 den./36 fil. polyethylene terephthalate multifilament, and the resulting yarn was imparted a twist of 830 turns/m. by an Italian type twister. The electrically conductive yarn thus obtaned was doubled with two preliminarily twisted 75 den./36 fil. polyethylene terephthalate yarns not containing an electrically conductive fiber, and the resulting yarn was imparted a twist of 530 turns/m. Thereafter, the resulting yarn was heat set in vacuo for 20 minutes at 130° C. in the form of skein, scoured, and dyed.

According to the processes mentioned above the sewing thread containing an electrically conductive fiber was easily obtained as in the production of ordinary sewing threads. The only necessity was to pay an appropriate attention to the control of tension of the yarn in doubling and twisting steps.

Using the electrically conductive sewing thread so obtained as lower thread and an ordinary polyethylene terephthalate sewing thread containing no electrically conductive filament as upper thread, a tricot shirt consisting of 100% polyethylene terephthalate fibers was sewn in accordance with the usual sewing specification. The ratio of the electrically conductive monofilament contained in the shirt was about 0.05%. The shirt thus obtained and a shirt sewn with an ordinary sewing thread were washed with a nonionic detergent for five minutes in an electric washer.

These shirts were subjected to wearing and undressing electrification tests at 25° C. and 25% RH. A person put on an undershirt made of polyvinyl chloride fibers, and then a shirt containing no electrically conductive filament. After rubbing them vigorously, he put off the shirt. There was a hissing sound of electrostatic discharge. The shirt clung to his body, and flared. When he touched a conductive material such as metal, he received an unpleasant electrical shock. At this time, the shirt exhibited at electrification voltage of +60 kv., and the human body, −10 kv. On the other hand, when he wore the shirt sewn with the electrically conductive sewing thread of the invention, the electrification voltage of the shirt and the human body were only +10 kv., and −2 kv., respectively. Moreover, the electrostatic troubles abovementioned were almost obviated. It was recognized therefore that the incorporation of a very small amount of the electrically conductive filament had a marked antistatic effect.

The shirt was repeatedly washed 100 times, but its antistatic effect was hardly lost, showing an excellent durability.

EXAMPLE 8

To clarify the effects and advantages of the present invention more, various polymers and compounds were each applied to an electrically conductive coating layer by the same operation as in the preparation of Sample A-3 in Example 1. The properties of the resulting electrically conductive filaments are given in Table 9. These results substantiate the effects of the present invention.

4. The filament of claim 1, wherein said finely divided electrically conductive solid material is selected from the group consisting of electrically conductive carbon, silver, gold, platinum, aluminum, copper, nickel, tungsten, and mixtures thereof.

5. The filament of claim 1, wherein said polyisocyanate is selected from the group consisting of aliphatic diisocyanates, alicyclic diisocyanates, aromatic diisocyanates, polyisocyanates having three or more functional groups derived from polyvalent primary amines having three or more functional groups, polyisocyanate urethanes obtained by the reaction of diisocyanates with polyhydric alcohols having three or more functional groups, diisocyanates of molecular weight less than 1,000 having an isocyanate group at both terminals and obtained by the reaction of low molecular weight polyethers and diisocyanates, and diisocyanates of molecular weight less than 1,000 having an isocyanate group at both terminals and obtained by the reaction of low molecular weight polyesters with diisocyanates.

6. The filament of claim 1, wherein the electrically conductive material is silver in an amount of 70 to 90% by weight, based on the weight of the coating, and the average thickness of the coating is 0.5 to 10 microns.

7. The filament of claim 6, wherein the average thickness of the coating is 0.7 to 5 microns.

8. The filament of claim 6, wherein the silver has an average particle size not greater than 5 microns.

9. The filament of claim 1, wherein the electrically conductive material is carbon in an amount of 7 to 60% by weight, based on the weight of the coating, and the average thickness of the coating is 1 to 15 microns.

TABLE 9

| Sample No. | Compound or polymer applied to the electrically conductive coating | | Electrical resistance (ohm/cm.) | | | Coefficient of friction |
| --- | --- | --- | --- | --- | --- | --- |
| | Kinds | Amount applied (percent) | Before test | After the oil resistance test | After the drycleaning resistance test | |
| H-1 | Acrylonitrile/butadiene copolymer/phenol resin binder (matrix component used in Example 1). | 3.5 | 100 | ∞ | ∞ | 0.85 |
| H-2 | Modified phenol resin (used in Example 1) | 4.0 | 130 | ∞ | ∞ | 0.60 |
| H-3 | Chloroprene/phenol resin binder | 4.0 | 120 | ∞ | ∞ | 0.60 |
| H-4 (comparisons)[1] | Butyl etherified melamine resin | 4.0 | 200 | ∞ | ∞ | |
| H-5 | Polysiloxane (reactive type) | 3.5 | 70 | ∞ | ∞ | 0.25 |
| H-6 | Phenyl monoisocyanate | 3.0 | 70 | ∞ | 8×10³ | 0.32 |
| H-7 | Prepolymer obtained by attaching tolylene diisocyanate to both ends of polycaprolactone of molecular weight 1,650. | 4.0 | 120 | ∞ | ∞ | 0.40 |
| A-3 (invention) | 4,4'-diphenylmethane diisocyanate | 3.6 | 50 | 100 | 80 | 0.2 |

[1] The curing was insufficient.

What we claim is:

1. An electrically conductive filament having an electrical resistance of less than $10^9$ ohms/cm., which comprises a synthetic organic filament of 5 to 50 denier and an electrically conductive coating layer surrounding the entire filament, which coating layer comprises (1) a polymeric binder matrix of an acrylonitrile/butadiene copolymer and a phenolic resin and (2) a finely divided electrically conductive solid material dispersed in the matrix, the weight ratio of the copolymer to the phenolic resin in the matrix being 0.6:1 to 3:1, and which coating layer is an after-treated and cured layer resulting from application thereto of 0.3 to 20% by weight, based on the weight of the electrically conductive filament, of a polyisocyanate having a molecular weight not exceeding 1,000 and having the formula $R(NCO)_n$, wherein R is an organic radical and n is an integer of 2 to 6.

2. The filament of claim 1, wherein said acrylonitrile/butadiene copolymer contains 25 to 45% by weight of acrylonitrile.

3. The filament of claim 1, wherein the phenolic resin is an oil-soluble phenolic resin.

10. A textile material comprising filaments as claimed in claim 1 and non-conductive organic textile fibers.

11. The textile material of claim 10, which contains less than 2% by weight of the conductive filaments.

12. The textile material of claim 11, which contains 0.001 to 1.5% by weight of the conductive filaments.

13. The textile material of claim 10 in the form of a garment, carpet or upholstery.

References Cited

UNITED STATES PATENTS

| | | | |
| --- | --- | --- | --- |
| 3,582,445 | 6/1971 | Okuhashi | 117—226 X |
| 2,897,094 | 7/1959 | Hayes et al. | 117—62.1 |
| 2,929,737 | 3/1960 | Tischbein | 117—76 T |

WILLIAM D. MARTIN, Primary Examiner

T. G. DAVIS, Assistant Examiner

U.S. Cl. X.R.

117—62.1, 138.8 A, 138.8 F, 138.8 N, 138.8 VA, 139.5 CF, 161 L, 161 UD, 161 UN, 227